United States Patent
Hama et al.

(10) Patent No.: US 7,006,269 B2
(45) Date of Patent: Feb. 28, 2006

(54) MULTI-BEAM SCANNING DEVICE

(75) Inventors: Yoshihiro Hama, Saitama-ken (JP); Mikio Horie, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 199 days.

(21) Appl. No.: 10/752,690

(22) Filed: Jan. 8, 2004

(65) Prior Publication Data

US 2004/0141220 A1 Jul. 22, 2004

(30) Foreign Application Priority Data

Jan. 9, 2003 (JP) ............................ 2003-003649

(51) Int. Cl.
*G02B 26/08* (2006.01)
(52) U.S. Cl. .................... 359/204; 359/206; 359/216; 347/232
(58) Field of Classification Search ................ 359/204
See application file for complete search history.

(56) References Cited

U.S. PATENT DOCUMENTS

| 3,804,485 | A | * | 4/1974 | Clarke ........................ 359/216 |
| 4,329,012 | A | * | 5/1982 | Minoura et al. ............ 359/202 |
| 6,198,562 | B1 | | 3/2001 | Hayashi et al. |
| 2003/0184833 | A1 | | 10/2003 | Hama et al. |

FOREIGN PATENT DOCUMENTS

| JP | 9-146024 | 6/1997 |
| JP | 2000-249948 | 9/2000 |
| JP | 2001-194605 | 7/2001 |
| JP | 2002-296677 | 10/2002 |
| JP | 2002-300497 | 10/2002 |
| JP | 2003-295078 | 10/2003 |

OTHER PUBLICATIONS

English Language Abstract of JP2003-295078.

* cited by examiner

*Primary Examiner*—James Phan
(74) *Attorney, Agent, or Firm*—Greenblum & Bernstein, P.L.C.

(57) ABSTRACT

A multi-beam scanning device includes a multi-beam light source unit that emits a plurality of light beams having different wavelengths. The light beams are aligned in a main scanning direction. The device further includes first polygonal mirror that deflects the plurality of light beams in the main scanning direction, an fθ optical system, a second polygonal mirror that deflects the plurality of light beams passed through the fθ optical system in an auxiliary scanning direction that is perpendicular to the main scanning direction, the second polygonal mirror deflects the plurality of light beams in the auxiliary direction by one line at each main scanning of the plurality of light beams, and a projecting optical system that projects the plurality of light beams deflected by the second polygonal mirror on a screen.

14 Claims, 6 Drawing Sheets

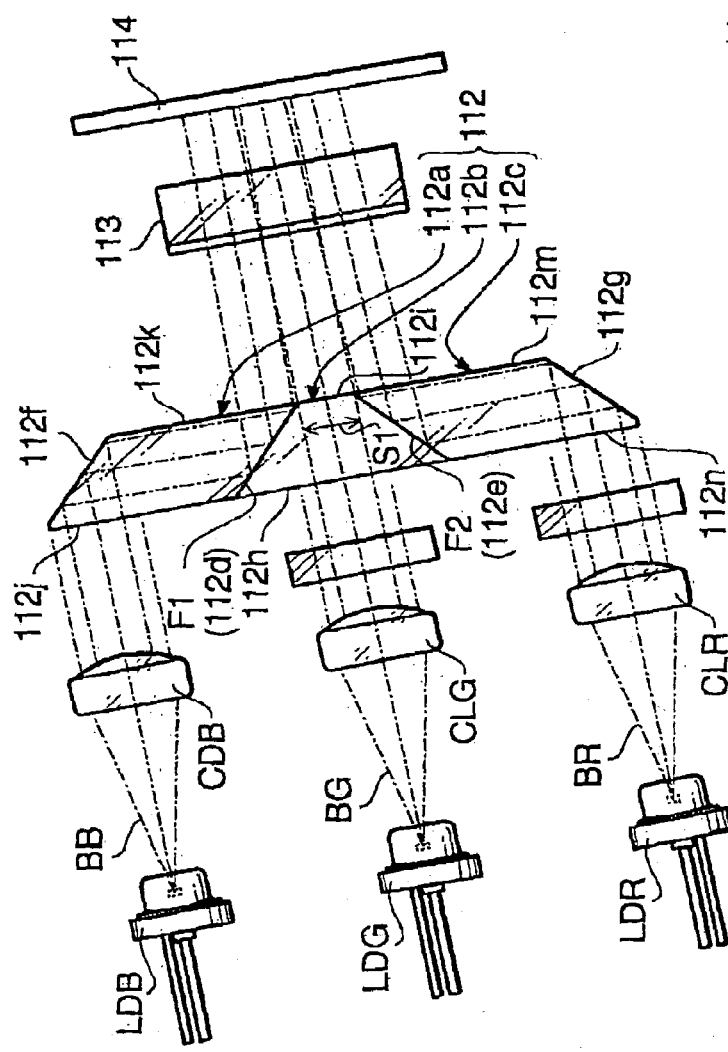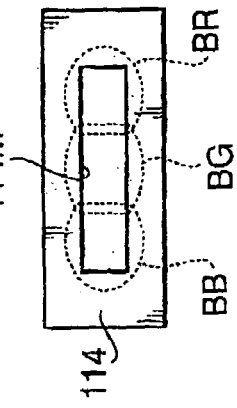

MULTI-BEAM SCANNING DEVICE

BACKGROUND OF THE INVENTION

The present invention relates to a multi-beam scanning device that projects an image on a screen.

Conventionally, a multi-beam light source as disclosed in Japanese Patent Provisional Publication No. 2000-249948 has been known. Such a multi-beam light source is used in a light scanning type image projector such as ones disclosed in Japanese Patent Provisional Publications No. 2002-296677 and No. 2002-300497. In the projector, light beams emerged from the multi-beam light source device are scanned on a screen to form an image thereon. Such an image projector can form a sharp image without an imaging optical system. It should be noted that the image optical system is required in a image projecting type projector in which light is passed through an LCD on which an image is formed, and the image is projected on the screen through the imaging optical system.

In the above-described image scanning type projector employing the multi-beam light source device, in order to scan the beams in a vertical direction, a galvano mirror is used. Generally, in the scanning type projecting device, the rocking movement is executed at a relatively high speed. Typically, several tens of reciprocating motions are executed accurately in one second. In order to achieve such high speed rocking movements accurately, rapid acceleration/deceleration should be done accurately. Therefore, the conventional scanning type projector employing the conventional multi-beam light source device is required to employ a high-accuracy controlling mechanism.

In the projector disclosed in Japanese Patent Provisional Publications No. 2002-296677, RGB (red, green and blue) beams are combined using a beam combining prism and the combined beam is scanned on the screen. However, such a beam combining prism is required to exhibit a reflection/transmission property that has wavelength selectivity. Such a prism is relatively expensive, which increases a manufacturing cost.

The projector disclosed in Japanese Patent Provisional Publication No. 2000-249948 is configured to scan a plurality of beams on the screen without using a converging lens. However, the projector as disclosed in this publication is configured such that split angles, which are angles formed between respective beams, are relatively large. Due to the large split angles, the beams are incident on an fθ lens at different incident angles in the scanning direction. Therefore, in such a case, uniformity of the scanning speed of the beams on the screen may be deteriorated, and a color shift may occur in the image formed on the screen.

SUMMARY OF THE INVENTION

The present invention is advantageous in that a multi-beam light source device which can perform a vertical scanning without a high-accuracy control mechanism is provided. Further, according to the invention, a color image having less color shift can be formed. Further, the projector does not require an expensive optical element such as a cemented prism.

According to an aspect of the invention, there is provided a multi-beam scanning device which includes a multi-beam light source unit that emits a plurality of light beams having different wavelengths, the plurality of light beams being aligned in a main scanning direction, a first polygonal mirror that deflects the plurality of light beams emitted by the multi-beam light source in the main scanning direction, an fθ optical systems the plurality of light beams deflected by the first polygonal mirror to scan at a substantially constant speed, a second polygonal mirror that deflects the plurality of light beams passed through the fθ optical system in an auxiliary scanning direction that is perpendicular to the main scanning direction, the second polygonal mirror deflects the plurality of light beams in the auxiliary direction by one line at each main scanning of the plurality of light beams, and a projecting optical system that projects the plurality of light beams deflected by the second polygonal mirror on a screen.

Optionally, the multi-beam scanning device may further include a horizontal synchronizing signal generating system that detects passage of at least one of the plurality of light beams through a predetermined position in the main scanning direction and generates a horizontal synchronizing signal, a vertical synchronizing signal generating system that detects passage of the plurality of light beams through another predetermined position in the auxiliary scanning direction and generates a vertical synchronizing signal, and a light source driving circuit that outputs modifying signals to modify the plurality of light beams based on image data, the horizontal synchronizing signal and the vertical synchronizing signal.

In a particular case, the horizontal synchronizing signal generating system detects passage of each of the plurality of light beams through the predetermined position in the main scanning direction and generates a horizontal synchronizing signal for each of the plurality of light beams.

Optionally, the plurality of light beams may include first, second and third light beams having different wavelengths. In particular, the light source unit has first, second and third laser diodes that emit the first, second and third light beams, respectively.

According to an embodiment, the first, second and third light beams are red, green and blue beams, respectively.

Further optionally, the light source driving circuit may include an image processing system that divides the image data into image data which includes red, green and blue components, a video signal generating system that generates a video signal that synchronizes the horizontal synchronizing signal and the vertical synchronizing signal based on each of the red, green and blue components of the image data, and a signal outputting system that generates and outputs a modulated signal, the modulated signal being transmitted to respective laser diodes.

In this case, the signal outputting system may adjust output timings of the modulated signals so that positions of images, on the screen, respectively formed by the plurality of light beams coincide with each other.

Further, the signal outputting system may adjust the output timings based on the horizontal synchronizing signals for respective ones of the plurality of light beams.

Still optionally, the light source unit may include first, second and third light sources emitting the first, second and third light beams, respectively, the first, second and third light sources being arranged in the main scanning direction, and an optical path shifting system that receives the first, second and third light beams arranged along the main scanning direction with a predetermined distances therebetween, the optical path shifting system outputting the first, second and third light beams, which are arranged along the main scanning direction with distances smaller than the predetermined distances therebetween.

In this case, the distances between the first, second and third light beams emerged from the optical path shifting system may be substantially zero.

According to an embodiment, the optical path shifting system may include a first prism having a shape of a parallelogram on a plane parallel with an optical axis of the first light source and the main scanning direction, the first prism having a first reflection surface and a second reflection surface which are opposite surfaces arranged in the main scanning direction, the first light beam incident on the first prism being reflected by the first reflection surface to proceed toward the second reflection surface, the first light beam reflected by the second reflection surface emerging from the first prism from a surface opposite to a surface from which the first light beam enter the first prism, a second prism having a shape of an isosceles trapezoid on a plane parallel with an optical axis of the second light source and the main scanning direction, the isosceles trapezoid having a first oblique side and a second oblique side, a surface of the second prism corresponding to the first oblique side of the isosceles trapezoid being cemented with the second reflection surface of the first prism, the second beam being incident on the second prism from a surface corresponding to a longer base of the isosceles trapezoid and emerges from the second prism from a surface corresponding to a shorter base of the isosceles trapezoid, and a third prism having a shape of a parallelogram on a plane parallel with an optical axis of the third light source and the main scanning direction, the third prism having a third reflection surface and a fourth reflection surface which are opposite surfaces arranged in the main scanning direction, the third light beam incident on the third prism being reflected by the fourth reflection surface to proceed toward the third reflection surface, the third light beam reflected by the third reflection surface emerging from the third prism from a surface opposite to a surface from which the third light beam entered the third prism, a surface of the second prism corresponding to the second oblique side of the isosceles trapezoid being cemented with the third reflection surface of the third prism, a width in the main scanning direction of the second beam entered the second prism being restricted by end portions of the second reflection surface and the third reflection surface, the first, second and third beam emerging from the first, second and third prisms being closely adjacent to each other.

Optionally, the multi-beam scanning device may further be provided with a slit arranged between the optical path shifting device and the first polygonal mirror, the slit shields side portions of the first light beam and the third light beam so that the widths of the first light beam and the third light beam, in the main scanning direction, are substantially equal to the width of the second light beam in the main scanning direction.

Further optionally, the multi-beam scanning unit may be configured to emit a first beam, a second beam and a third beam having different wavelengths. Further, the multi-beam scanning unit may include a prism unit which has a first reflection surface that reflects the first beam toward the second beam, a second reflection surface that reflects the first beam reflected by the first reflection surface toward the first polygonal mirror, a part of the second beam being shielded by the second reflection surface, a third reflection surface that reflects the third beam toward the second beam, and a fourth reflection surface that reflects the third beam reflected by the third reflection surface toward the first polygonal mirror, apart of the second beam being shielded by the fourth reflection surface.

BRIEF DESCRIPTION OF THE ACCOMPANYING DRAWINGS

FIG. 3A is an enlarged plan view of the light source unit according to the embodiment of the invention;

FIG. 3B is a front view of a slit plate 114;

DESCRIPTION OF THE EMBODIMENT

Hereinafter, a multi-beam scanning device according to an embodiment of the invention will be described with reference to the accompanying drawings.

Figure 1:
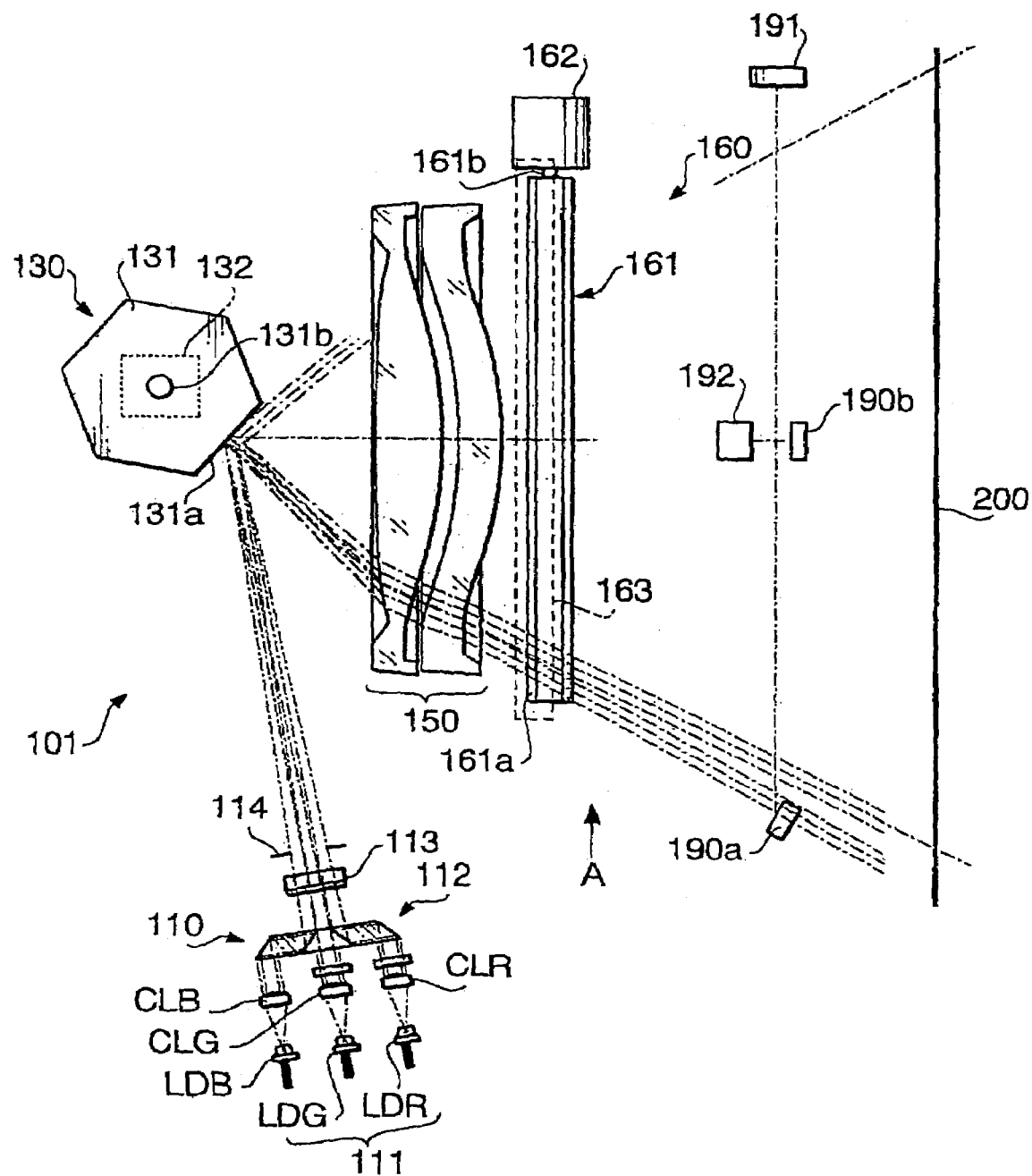
FIG. 1 is a plan view of an optical system of a multi-beam scanning device according to an embodiment of the invention.
Figure 2:
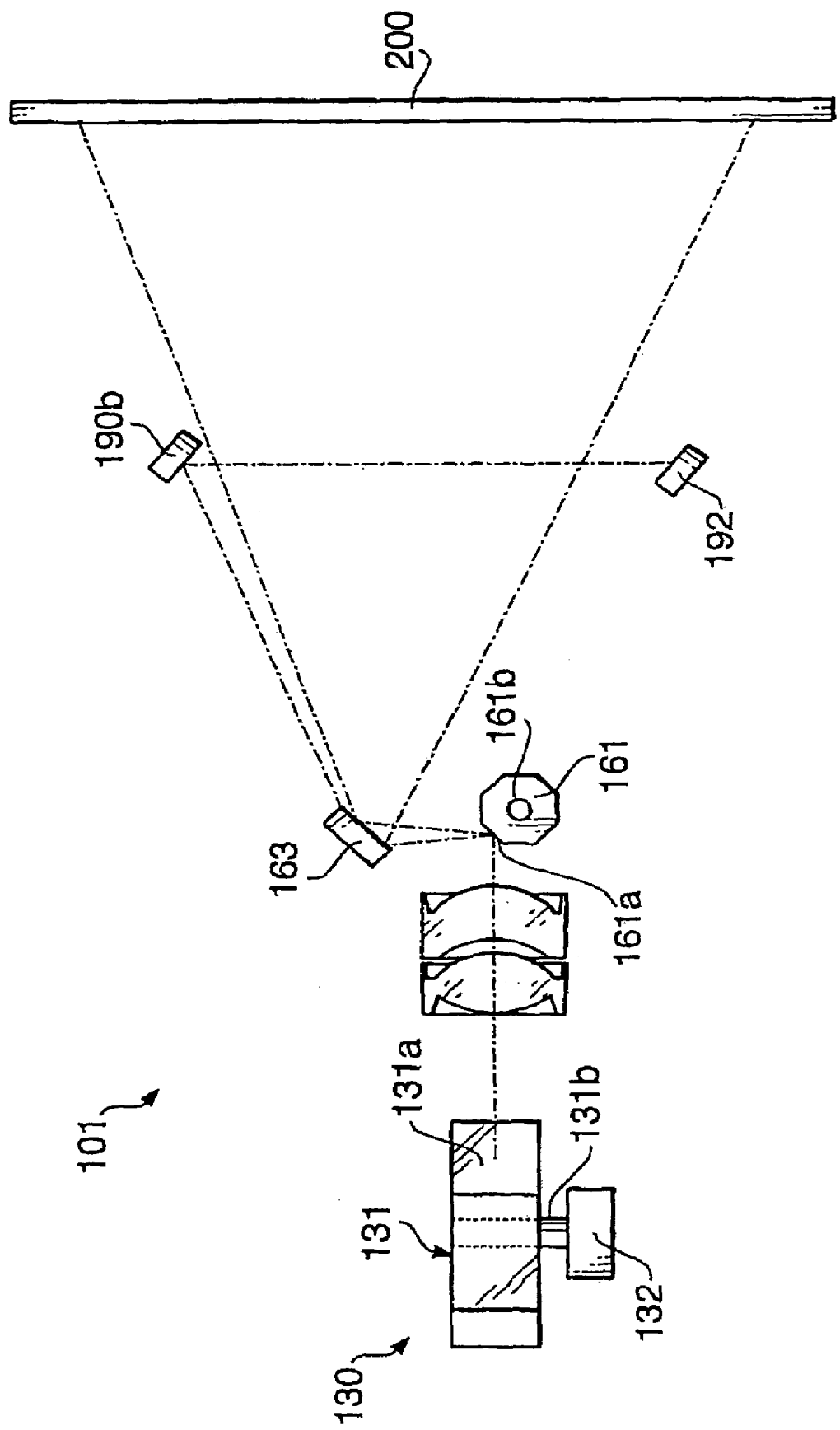
FIG. 2 is a side view of the optical system of the multi-beam scanning device viewed along arrow A in FIG. 1.

FIG. 1 is a plan view of an optical system of a multi-beam scanning device 101 according to an embodiment of the invention. FIG. 2 is a side view of the optical system of the multi-beam scanning device viewed along arrow A shown in FIG. 1.

The multi-beam scanning device 101 includes a light source unit 110, a horizontal scanning unit 130, an fθ lens 150, a vertical scanning unit 160, a first beam detecting mirror 190a, a first sensor 191 and a second sensor 192.

The light source unit 110 includes a multi-beam laser array 111, which includes a blue laser source LDB, a green laser source LDG, and a red laser source LDR. The blue laser source LDB, the green laser source LDG and the red laser source LDR are arranged on a horizontal plane, which is parallel to a plane of FIG. 1, in this order, and are configured to emit blue laser beam, green laser beam and red laser beam in a pulsed manner, respectively. The laser beams emitted by the blue, green and red laser sources LDB, LDG and LDR are incident on collimating lenses CLB, CLG and CLR, respectively, and are converged into beams each having parallel light fluxes.

The collimated laser beams are incident on a prism unit 12, which deflects each of the incident laser beams such that the laser beams are on the same horizontal plane, close to each other, and parallel with each other.

The structure of a prism unit 112 will be described in detail below.

FIG. 3A is an enlarged view of the light source unit 110 according to the embodiment of the invention. The prism unit 112 includes first prism 112a, second prism 112b and third prism 112c, which receive blue, green and red laser beams BB, BG and BR, respectively. The second prism 112b is arranged between the first prism 112a and the third prism 112c. One of opposite two surfaces of the second prism 112b is cemented with a side surface of the first prism 112a, and the other one of the opposite two surfaces of the second prism 112b is cemented with a side surface of the third prism 112c.

A first reflection layer 112d is formed between the surfaces at which the first and second prisms 112a and 112b are cemented, a second reflection layer 112e which is similar to the first reflection layer 112*d* is formed between the surfaces, at which the second and third prisms 112*b* and 112*c* are cemented.

On third and fourth surfaces 112*g* and 112*f*, which are cemented with the second prism 112*b*, of the first and third prisms 112*a* and 112*c*, reflection layers are formed for reflecting the blue and red laser beams. It should be noted that, as the reflection layers, thing metallic films may be used.

The second prism 112*b* has a trapezoidal cross section having a bottom surface 112*h* and a narrower top surface 112*i*, which are parallel with each other. The second prism 112*b* is arranged, in the optical path of the green laser beam BG, such that the bottom surface 112*h* is located on the green laser source LDG side, and the top surface 112*i* is located on the horizontal scanning unit 130 side. Because of this arrangement, the green laser beam BG is incident on the second prism 112*b* from the bottom surface 112*h* thereof, and emerges from the top surface 112*i* toward the horizontal scanning unit 130.

Since the first and second reflection layers 112*d* and 112*e* are arranged on the side surfaces of the second prism 112*b* having a shape described above, there is a clearance S1. between closer ends of the reflection layers 112*d* and 112*e*. The clearance S1 is substantially equal to the width of the top surface of the second prism 112*b*.

According to the embodiment, the width of the top surface 112*i* of the second prism 112*b* is narrower than the beam width (as viewed in FIG. 3A) of the green laser beam BG. Therefore, the clearance S1 between the closer ends of the first and second reflection layers 112*d* and 112*e* is narrower than the beam width of the green laser beam BG.

According to the present embodiment, the prism unit 112 is arranged such that the chief ray of the green laser beam BG passes substantially the center of the top surface 112*i* of the second prism 112*b*. Accordingly, a peripheral portion of the green laser beam BG is incident on the first reflection layer 112*d* and the second reflection layer 112*e*. The portions of the green laser beam GB incident on the first and second reflection layers 112*d* and 112*e* are reflected to proceed in a direction different from a direction where the horizontal scanning unit 130 is located. Therefore, the green laser beam BG passes the prism unit 112, thereby the width of the beam being restricted to the clearance S1, which is a distance between the closer ends of the first and second reflection layers 112*d* and 112*e*.

The blue laser beam BB enters the first prism 112*a* through the front surface 112*j*, and reflected by the third reflection surface 112*f* toward the first reflection layer 112*d*. Further, the blue laser beam BB is reflected by the first reflection layer 112*d*, and is directed, from a rear surface 112*k* of the first prism 112*a*, toward the horizontal scanning unit 130.

The third reflection surface 112*f* reflects the blue laser beam BB such that the reflected blue laser beam BB is incident on a horizontal polygonal mirror 131 side end of the first reflection layer 112*d*. With this configuration, the blue laser beam BB reflected by the first reflection layer 112*d* emerges from the prism unit 112 at a portion closely adjacent to a portion where the green laser beam BG emerges from the prism unit or at a portion next to the green laser beam BG without a clearance. That is, the green laser beam BG and the blue laser beam BB emerge from the prism unit 112 with no substantial clearance therebetween. Accordingly, in the multi-beam scanning device 101, a split angle θ formed between the blue laser beam BB and the green laser beam BG in a direction where the horizontal polygonal mirror 131 of the horizontal scanning unit 130 rotates can be made very small.

The red laser beam BR enters the third prism 112*c* through its front surface 112*n*, and is reflected by the fourth reflection layer 112*g* toward the second reflection layer 112*e*. The red laser beam BR is then reflected by the second reflection layer 112*e*, and emerges to the horizontal scanning unit 130 through a rear surface 112*m* of the third prism 112*c*. The fourth reflection layer 112*g* reflects the red laser beam BR such that the red laser beam BR is incident on the polygonal mirror side end portion of the second reflection layer 112*e*. With this configuration, the red laser beam BR reflected by the first reflection layer 112*g* emerges from the prism unit 112 at a portion closely adjacent to a portion where the green laser beam BG emerges from the prism unit or at a portion next to the green laser beam BG without a clearance. That is, the green laser beam BG and the red laser beam BR emerge from the prism unit 112 with no substantial clearance therebetween. Accordingly, the split angle which is an angle formed between the red laser beam BR and the green laser beam BG in the direction where the horizontal polygonal mirror 131 rotates can be made very small.

It should be noted that, instead of providing reflection coatings on the side surfaces 112*f* and 112*g*, the prism unit 112 may be designed such that the beams BB and BR are incident on the surfaces 112*f* and 112*g* at the incident angles greater than the critical angles, respectively. With such a configuration, without the reflection coatings, the incident beams are totally reflected by the side surfaces 112*f* and 112*g*, respectively.

As described above, according to the prism unit 112, the blue, green and red laser beams emerge from the prism unit 112 such that they are on the same plane, parallel with and close to each other.

The laser beams emerged from the prism unit 112 proceed horizontally, and are directed to the horizontal scanning unit 130 through a cylindrical lens 113 and a slit plate 114. The cylindrical lens 113 is configured such that each laser beam converges, only in the vertical direction (which is a direction perpendicular to a plane of FIG. 1), on a plane in the vicinity of a reflection surface 131*a* of the horizontal polygonal mirror 131. The slit plate 114 is for defining an effective cross sectional area of each of the laser beams BR, BG and BB. In the present embodiment, as shown in FIG. 3B, the slit plate 114 is formed with a rectangular slit 114M defining heights and widths of the blue, red and green laser beams passing therethrough, respectively. As shown in FIG. 3A, the width of the laser beam BG is defined by the ends of the reflection surfaces 112*d* and 112*e*. As shown in FIG. 3B, the left-hand side of the beam BB is defined by the left-hand side end of the slit 114M, and the right-hand side of the beam BR is defined by the right-hand side of the slit 114M. The height of all the beams BB, BG and BR is defined by the height of the slit 114M. By providing the slit plate 114, which shields the up-and-down and right-and-left side portions of the laser beams, the heights and widths of the blue and red beams BB and BR are made substantially equal to the height and width of the green laser beam BG.

The horizontal scanning unit 130 includes a horizontal polygonal mirror 131 and a first motor 132 that rotates the horizontal polygonal mirror 131. The laser beams are incident on the reflection surface 131*a* of the horizontal polygonal mirror 131. The horizontal polygonal mirror 131 is configured such that its rotational axis 131*b* extends in the vertical direction, and each reflection surface 131*a* of the horizontal polygonal mirror 131 is perpendicular to the horizontal plane. Therefore, the laser beams incident on the reflection surface 131a of the horizontal polygonal mirror 131 are reflected thereby and proceeds with maintaining the parallel and close relationship therebetween. The first motor 132 is configured to rotate the horizontal polygonal mirror 131 about the rotational axis 131b counterclockwise in FIG. 1 at a constant angular speed. The laser beams incident on the reflection surface 131a of the horizontal polygonal mirror 131 are reflected thereby and scan at a constant speed from a lower side to an upper in FIG. 1.

the laser beams reflected by the reflection surface 131a pass through the fθ lens 150 and are incident on the vertical scanning unit 160.

The vertical scanning unit 160 includes a vertical polygonal mirror 161, a second motor 162 that rotates the vertical polygonal mirror 161, and a mirror 163. The laser beams are directed to be incident on a reflection surface 161a of the vertical polygonal mirror 161. The vertical polygonal mirror 161 is arranged such that its rotational axis 161b extends in the horizontal direction. Thus, the laser beams incident on the reflection surface 161a of the vertical polygonal mirror 161 are deflected in the vertical direction and are incident on the mirror 163 with maintaining the parallel and close relationship therebetween (see FIG. 2). The laser beams incident on the mirror 163 are deflected by the mirror 163. The second,motor 162 is configured to rotate the vertical polygonal mirror 161 about the axis 161b at a constant angular speed in the counterclockwise direction in FIG. 2. The laser beams incident on the reflection surface 161a and the mirror 163 scan from the upside to the down side in FIG. 2 periodically.

In the multi-beam scanning device 101 configured as above, by setting a vertical scanning period to be an integer multiple of a horizontal scanning period, a plurality of horizontal (i.e., main) scanning operations (several hundreds to several thousands) are executed during one vertical (i.e., auxiliary) scanning operation. In this case, the multi-beam scanning device 101 scans a scanning area that is defined by the scanning angle of the beams deflected by the horizontal polygonal mirror 131 and the scanning angle of the beams deflected by the vertical polygonal mirror 161 and the mirror 163.

A screen 200 is provided corresponding to the scanning area described above. The red, green and blue laser beams are incident on the screen 200 to form a color image. By setting the period for the vertical scanning to, for example, ⅟₃₀ seconds, an observer of the screen 200 feels that the entire scanning area of the screen 200 is illuminated with the laser beams simultaneously.

As shown in FIGS. 1 and 2, the first beam detecting mirror 190a is arranged at an end portion of the scanning range (at the lower end in FIG. 1). The first beam detecting mirror 190a is for reflecting the scanning beams to the first sensor 191, the output of which is used for generating a horizontal synchronizing signal. That is, based on a time after the laser beams are incident on the first sensor 191, the direction of each laser beam in the horizontal direction can be detected.

Similarly, a second beam detecting mirror 190b is arranged at an end portion of the vertical scanning range (at the upper end in FIG. 2). The second beam detecting mirror 190b is for reflecting the scanning beams to the second sensor 192, the output of which is used for generating a vertical synchronizing signal. That is, based on the vertical synchronizing signal, the direction of each laser beam in the vertical direction can be detected. Accordingly, based on the horizontal synchronizing signal and the vertical synchronizing signal, the direction in which the laser beams are directed can be identified.

To the multi-beam scanning device 101, a composite video signal such as an NTSC signal or an RGB video signal may be input. A light source control unit 180 is provided, which modulates the output of the laser beams based on the composite video signal or the RGB video signal.

Figure 4:
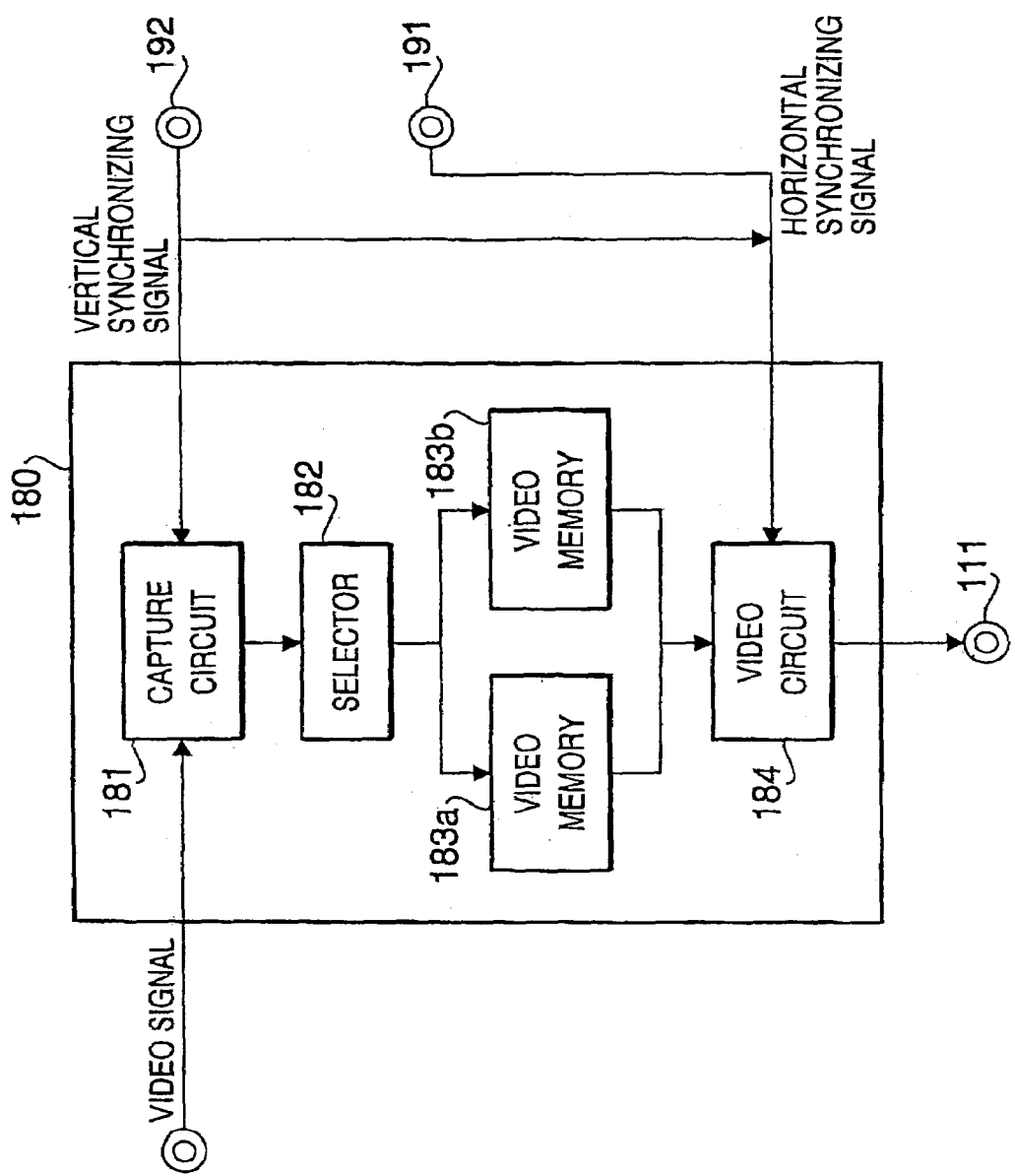
FIG. 4 is a block diagram of a light source control unit according to the embodiment of the invention.

FIG. 4 is a block diagram of the light source control unit 180 according to the embodiment. The light source control unit 180 includes a capture circuit 181, a selector 182, video memories 183a and 183b and a video circuit 184.

The composite video signal or the RGB video signal is input to the capture circuit 181. The vertical synchronizing signal is also input to the capture circuit 181 from the second sensor 192.

The capture circuit 181 captures the composite video signal or the RGB video signal during a period, which is equal to a period between successive vertical synchronizing signals, as digital image data. The captured image data is converted such that the number of horizontal lines coincides with the number of the main scanning lines within the scanning area. Then, the converted image data is color separated to generate R (red) data, G (green) data and B (blue) data. At the time of color-separation, various imaging processes such as gamma compensation and color space conversion are executed.

The RGB image data is transmitted to the selector 182. The selector 182 stores the transmitted RGB digital image data in one of the video memories 183a and 183b.

The video circuit 184 converts the RGB digital image data stored in the video memory 183a or 183b to the video signal synchronizing with the horizontal synchronizing signal and the vertical synchronizing signal. Then, based on the thus generated video signal, modulating signals for driving the blue laser source LDB, green laser source LDG and red laser source LDR are generated. As a result, the blue laser source LDB, green laser source LDG and red laser source LDR emit the blue, green and red laser beams modulated in accordance with the modulating signals, respectively. Thus, a color image captured by the capture circuit 181 is formed on the screen 200.

The light source control unit 180 employs a so-called double buffer method. That is, when the RGB digital image data is being stored in one of the video memories 183a and 183b, the data having been stored in the other of the video memories 183a and 183b is converted into the modulating signals by the video circuit 184, and transmitted to the blue laser source LDB, green laser source LDG and red laser source LDR.

The laser beams BB, BG and BR emerging from the prism unit 112 proceed horizontally toward the horizontal polygonal mirror 131. Positions at which the laser beams impinge on the screen 200 depend not only on the phases of the horizontal polygonal mirror 131 and the vertical polygonal mirror 161, but on incident positions and incident angles at which the laser beams enter the horizontal polygonal mirror 131. That is, the incident positions and incident angles of the laser beams BB, BG and BR on the horizontal polygonal mirror 131 at the same instance are different. Therefore, the laser beams BB, BG and BR are incident on different positions on the screen 200 at the same instance.

In the present embodiment, when the laser beam BR is incident on a certain point on the screen 200, the laser beam BG is incident on another point located on the lower side of the point where the laser beam BR is incident in FIG. 1, and the laser beam BB is incident on another point which is a lower point in FIG. 1 with respect, to the point where the laser beam BG is incident. Therefore, if the output timings of the red laser source LDR, the green laser source LDG and the blue laser source LDB are the same, images projected using the laser beam GB and the laser beam BB on the screen 200 shift in the lower direction in FIG. 1. In order to avoid this problem, the output timing of the modifying signal for each main scanning line for the green laser source LDG, and the output timing of the modifying signal for each main scanning line of the blue laser source LDB are slightly delayed with respect to the output timing of the modifying signal for each main scanning line of the red laser source LDR.

Figure 5:
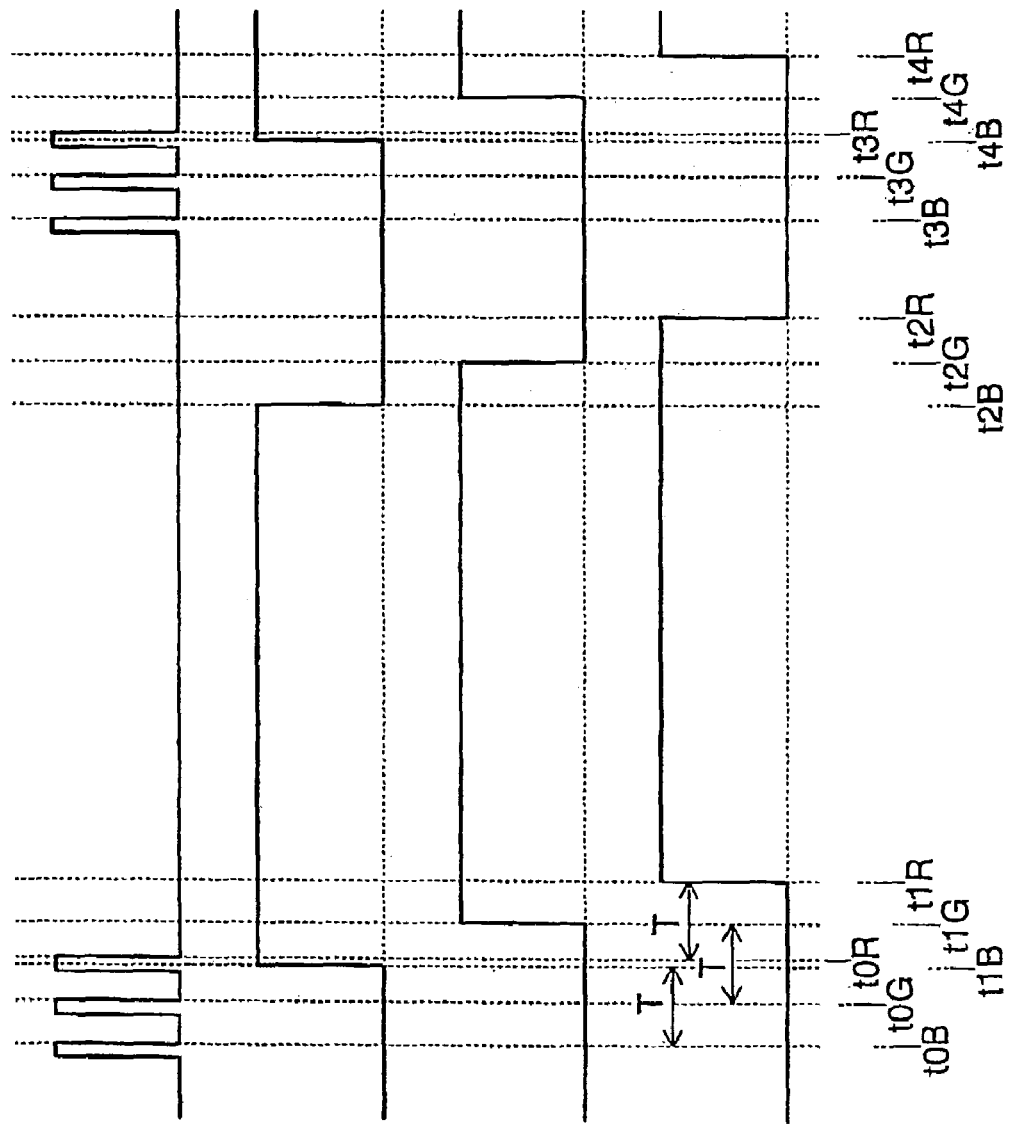
FIGS. 5A–5D show a time chart illustrating output timing of red, green and blue laser sources.

FIGS. 5A–5D show a timing chart illustrating the output timings of the modifying signals, which are output by the video circuit 184 to drive the red laser source LDR, the green laser source LDG and the blue laser source LDB. In particular, FIG. 5A shows timings of the horizontal synchronizing signals for blue, green and red components, and FIGS. 5B–5C show output timings of modifying signals for blue, green and red components, respectively.

It is assumed that the blue laser beam BB is incident on the first sensor 191 at time t0B, and the horizontal synchronizing signal for the blue laser beam BB is input to the video circuit 184. Then, after time T has passed from time t0B (i.e., time t1B), the output, to the blue laser source LDB, of the modulating signal of one main scanning line is started. Next, it is assumed that the green laser beam is incident on the first sensor 191 at time t0G, and the horizontal synchronizing signal for the green laser beam is input to the video circuit 184. Then, after time T has passed from time t0G (i.e., time t1G), the output of the modulating signal, to the green laser source LDG, of one main scanning line is started. Further, it is assumed that the red laser beam is incident on the first sensor 191 at time t0R, and the horizontal synchronizing signal for the green laser beam is input to the video circuit 184. Then, after time T has passed from time t0R (i.e., time t1R), the output of the modulating signal, to the blue laser source LDR, of one main scanning line is started.

The output of the modulating signals for the blue, green and red laser sources LDB, LDG and LDR are terminated at t2B, t2G and t2R, respectively. Then, at t3B, the next horizontal synchronizing signal for the blue laser beam is input to the video circuit 184, the output of the modulating signal for the blue laser source LDB starts after time T has passed, i.e., at t4B. When the horizontal synchronizing signal for the green laser beam is input at t3G, the output of the modulating signal for the green laser source LDG starts after time T has passed, i.e., at t4G. When the horizontal synchronizing signal for the red laser beam is input at T3R, the output of the modulating signal for the red laser source LDR starts after time T has passed, i.e., at t4R.

In the above-described embodiment, the horizontal synchronizing signal is generated for each of the blue, green and red beams BB, BG and BR. However, if the difference of the timings are considered to be fixed, it may be possible to used only one horizontal synchronizing signal, for example, that of the blue laser beam BB, and the output timings of the modifying signals for the other laser beams may be controlled by measuring time periods.

According to the present embodiment, the output timings of the modulating signals are adjusted so that the position which the blue laser beam BB strikes the screen 200 at time t1B, the position which the green laser beam BG strikes the screen 200 at time t1G and the position to which the red laser beam BR strikes the screen 200 at time, t1R coincide with each other. Therefore, the images respectively formed by the laser beams BB and BR do not shift with respect the image formed by the laser beam BG.

The present invention is not limited to the above-described exemplary embodiment, and various modification can be made without departing from the scope of the invention. For example, the prism unit 112 can replaced with another prism unit or prisms. Examples of such a prism unit is disclosed in U.S. patent application Ser. No. 10/347,917 (Publication No. US-2003-0142381-A1), which are also applicable to the present invention and teachings of which are incorporated herein by reference.

Figure 6:
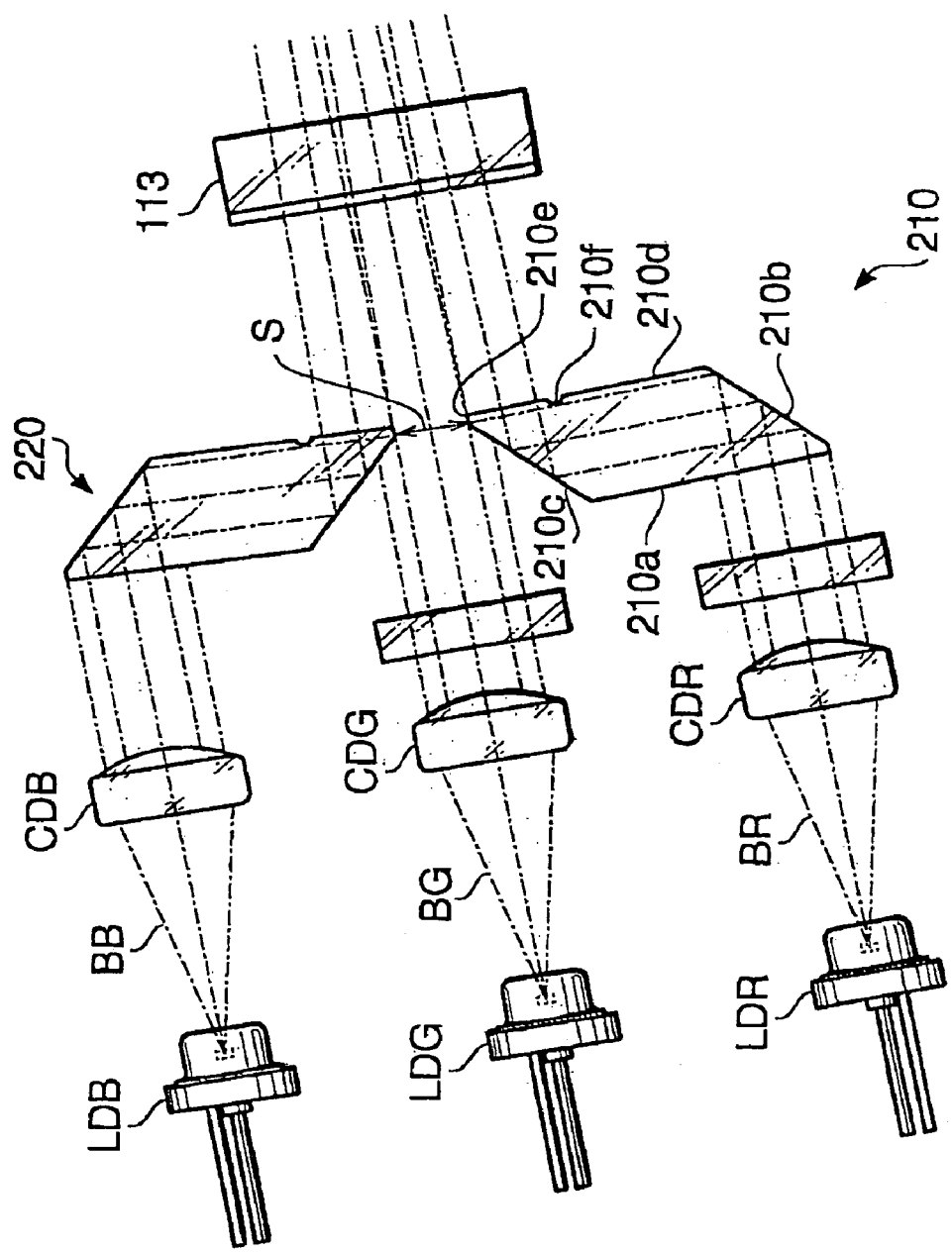
FIG. 6 is an enlarged plan view of a light source unit according to a modification of the embodiment.

FIG. 6 shows a modification of the light source unit 110 including an example of an alternative prism unit having a pair of prisms 210 and 220.

As shown in FIG. 6, the prisms 210 and 220 are arranged symmetrically with a clearance S therebetween. Since the function of the prism 220 is similar to that of the prism 210, only the prism 210 will be described.

The prism 210 has an entrance plane 210a through which the red beam BR enters the prism 210, first and second reflection planes 210b and 210c that reflect the red beam BR, and an exit plane 210d through which the red beam BR emerges.

The red beam BR enters the prism 210 from a portion of the entrance plane 210a that includes the corner defined between the entrance plane 210a and the first reflection plane 210b. The read beam BR that has entered the prism 210 is reflected by the first reflection plane 210b toward the second reflection plane 210c, then further reflected by the second reflection plane 210c toward the polygon mirror 131 and emerges from the exit plane 124d.

A chamfered edge 210e is formed at the corner defined between the second reflection plane 210c and the exit plane 210d. The red beam BR reflected by the first reflection plane 210b impinges not only on the second reflection surface 210c but also on the chamfered edge 210e. Thus, the red beam BR is also reflected at the edge portion of second reflection. plane 210c at the chamfered edge side.

The surface of the chamfered edge 210e is finished such that the light incident thereon is scattered. Further, a light blocking groove 210f is formed onto the exit plane 210d to reduce the amount of the third light beam 204 incident on the chamfered edge 210e. The blocking groove 210f is formed such that the depth of the blocking groove 210f is smaller than the width of the chamfered edge 210e. By forming the blocking groove 210f as above, the red beam BR hits the chamfered edge 124e only at the upper portion (i.e., at the portion corresponding to the difference between the width of the chamfered edge 210e and the depth of the light blocking groove 210f). By restricting the amount of light incident on the chamfered edge 210e as above, the occurrence of scattered light having high intensity can be prevented.

It should be noted that, instead of providing reflection surface on the side surfaces 210b, the prism 210 may be arranged such that the beam BR is incident on the surface 210 at the incident angle greater than the critical angle. With such a configuration, without providing a reflection coating on the surface 210, the incident beam is totally reflected by the surface 210. The prism 220 may also be arranged similarly.

The edge portion of the second reflection plane 210c at the exit plane side thereof is inserted into the optical path of the green beam BG. Accordingly, a part of the green beam GB impinges on the edge portion of the second reflection plane 210c. A reflection layer is formed on the second reflection plane 210c. Thus, the part of the green beam BG incident on the second reflection plane 210c is reflected and does not proceeds toward the polygon mirror 131.

As described above, the edge portion of the second reflection plane 210c blocks a part of the green beam GB while reflecting the red beam BR toward the polygon mirror 131. Thus, at the exit plane 210d of the prism 210, the red beam BR emerges from the prism 210 at an area where the green beam BG is blocked. As a result, the red beam. BR at the exit plane 210d is located adjacent to the green beam BG with no gaps therebetween.

As shown in FIG. 6, the prism 220 and the prism 210 are arranged such that a gap S is formed therebetween. The gap S allows the green beam BG passing therethrough toward the polygon mirror 131. It should be noted that the prism 220 and the prism 210 are preferably arranged such that the primary ray of the green beam BG passes through the gap S at about the center thereof. The gap S between the prism 220 and the prism 210 defines the width of the green beam BG.

The present disclosure relates to the subject matter contained in Japanese Patent Application No. 2003-003649, filed on Jan. 9, 2003, which is expressly incorporated herein by reference in its entirety.

What is claimed is:

1. A multi-beam scanning device, comprising:
    a multi-beam light source unit that emits a plurality of light beams having different wavelengths, the plurality of light beams being aligned in a main scanning direction;
    a first polygonal mirror that deflects the plurality of light beams emitted by the multi-beam light source in the main scanning direction;
    an fθ optical system, the plurality of light beams deflected by said first polygonal mirror to scan at a substantially constant speed;
    a second polygonal mirror that deflects the plurality of light beams passed through said fθ optical system in an auxiliary scanning direction that is perpendicular to the main scanning direction, said second polygonal mirror deflects the plurality of light beams in the auxiliary direction by one line at each main scanning of the plurality of light beams;
    a projecting optical system that projects the plurality of light beams deflected by said second polygonal mirror on a screen.

2. The multi-beam scanning device according to claim 1, further including:
    a horizontal synchronizing signal generating system that detects passage of at least one of the plurality of light beams through a predetermined position in the main scanning direction and generates a horizontal synchronizing signal;
    a vertical synchronizing signal generating system that detects passage of the plurality of light beams through another predetermined position in the auxiliary scanning direction and generates a vertical synchronizing signal; and
    a light source driving circuit that outputs modifying signals to modify the plurality of light beams based on image data, the horizontal synchronizing signal and the vertical synchronizing signal.

3. The multi-beam scanning device according to claim 2, wherein said horizontal synchronizing signal generating system detects passage of each of the plurality of light beams through the predetermined position in the main scanning direction and generates a horizontal synchronizing signal for each of the plurality of light beams.

4. The multi-beam scanning device according to claim 2, wherein the plurality of light beams include first, second and third light beams having different wavelengths.

5. The multi-beam scanning device according to claim 4, wherein said light source unit comprises first, second and third laser diodes that emit the first, second and third light beams, respectively.

6. The multi-beam scanning device according to claim 5, wherein the first, second and third light beams are red, green and blue beams, respectively.

7. The multi-beam scanning device according to claim 6, wherein said light source driving circuit comprises:
    an image processing system that divides the image data into image data, the image data including red, green and blue components;
    a video signal generating system that generates a video signal that synchronizes the horizontal synchronizing signal and the vertical synchronizing signal based on each of the red, green and blue components of the mono-color image data; and
    a signal outputting system that generates and outputs a modulated signal, the modulated signal being transmitted to respective laser diodes.

8. The multi-beam scanning device according to claim 7, wherein said signal outputting system adjusts output timings of the modulated signals so that positions of images, on the screen, respectively formed by the plurality of light beams coincide with each other.

9. The multi-beam scanning device according to claim 8, wherein said signal outputting system adjusts the output timings based on the horizontal synchronizing signals for respective ones of the plurality of light beams.

10. The multi-beam scanning device according to claim 4, wherein said light source unit comprises:
    first, second and third light sources emitting the first, second and third light beams, respectively, said first, second and third light sources being arranged in the main scanning direction; and
    an optical path shifting system that receives the first, second and third light beams arranged along the main scanning direction with a predetermined distances therebetween, said optical path shifting system outputting the first, second and third light beams, which are arranged along the main scanning direction with distances smaller than the predetermined distances therebetween.

11. The multi-beam scanning device according to claim 10, wherein the distances between the first, second and third light beams emerged from the optical path shifting system are substantially zero.

12. The multi-beam scanning device according to claim 10, wherein said optical path shifting system includes:
    a first prism having a shape of a parallelogram on a plane parallel with an optical axis of said first light source and the main scanning direction, said first prism having a first reflection surface and a second reflection surface which are opposite surfaces arranged in the main scanning direction, the first light beam incident on said first prism being reflected by said first reflection surface to proceed toward said second reflection surface, the first light-beam reflected by said second reflection surface emerging from the first prism from a surface opposite to a surface from which the first light beam enter said first prism;
    a second prism having a shape of an isosceles trapezoid on a plane parallel with an optical axis of said second light source and the main scanning direction, the isosceles trapezoid having a first oblique side and a second oblique side, a surface of said second prism corresponding to the first oblique side of the isosceles trapezoid being cemented with the second reflection surface of said first prism, the second beam being incident on said second prism from a surface corresponding to a longer base of the isosceles trapezoid and emerges from said second prism from a surface corresponding to a shorter base of the isosceles trapezoid;

a third prism having a shape of a parallelogram on a plane parallel with an optical axis of said third light source and the main scanning direction, said third prism having a third reflection surface and a fourth reflection surface which are opposite surfaces arranged in the main scanning direction, the third light beam incident on said third prism being reflected by said fourth reflection surface to proceed toward said third reflection surface, the third light beam reflected by said third reflection surface emerging from the third prism from a surface opposite to a surface from which the third light beam entered said third prism, a surface of said second prism corresponding to the second oblique side of the isosceles trapezoid being cemented with the third reflection surface of said third prism, a width in the main scanning direction of the second beam entered said second prism being restricted by end portions of said second reflection surface and said third reflection surface, the first, second and third beam emerging from said first, second and third prisms being closely adjacent to each other.

13. The multi-beam scanning device according to claim 12, further provided with a slit arranged between the optical path shifting device and said first polygonal mirror, said slit shields side portions of the first light beam and the third light beam so that the widths of the first light beam and the third light beam, in the main scanning direction, are substantially equal to the width of the second light beam in the main scanning direction.

14. The multi-beam scanning device according to claim 1, wherein said multi-beam scanning unit emits a first beam, a second beam and a third beam having different wavelengths, said multi-beam scanning unit including a prism unit having:

a first reflection surface that reflects the first beam toward the second beam;

a second reflection surface that reflects the first beam reflected by said first reflection surface toward said first polygonal mirror, a part of the second beam being shielded by said second reflection surface;

a third reflection surface that reflects the third beam toward the second beam; and a fourth reflection surface that reflects the third beam reflected by said third reflection surface toward said first polygonal mirror, a part of the second beam being shielded by said fourth reflection surface.

* * * * *